US011567635B2

(12) United States Patent
Hong et al.

(10) Patent No.: US 11,567,635 B2
(45) Date of Patent: Jan. 31, 2023

(54) ONLINE COLLABORATIVE DOCUMENT PROCESSING METHOD AND DEVICE

(71) Applicant: BEIJING BYTEDANCE NETWORK TECHNOLOGY CO., LTD., Beijing (CN)

(72) Inventors: Linshuang Hong, Beijing (CN); Yuan Xiao, Beijing (CN); Deying Ye, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/561,387

(22) Filed: Dec. 23, 2021

(65) Prior Publication Data

US 2022/0113847 A1    Apr. 14, 2022

Related U.S. Application Data

(63) Continuation of application No. PCT/CN2020/096961, filed on Jun. 19, 2020.

(30) Foreign Application Priority Data

Jun. 24, 2019    (CN) ........................ 201910549988.X

(51) Int. Cl.
*G06F 3/0482*    (2013.01)
*G06F 3/0484*    (2022.01)

(52) U.S. Cl.
CPC .......... *G06F 3/0482* (2013.01); *G06F 3/0484* (2013.01)

(58) Field of Classification Search
CPC ................................................ G06F 3/048–05
See application file for complete search history.

(56) References Cited

U.S. PATENT DOCUMENTS 5,671,428 A * 9/1997 Muranaga .............. G06Q 10/10
715/201
7,603,626 B2 * 10/2009 Williams ............... G06Q 10/10
715/201

(Continued)

FOREIGN PATENT DOCUMENTS

CN    101169875 A    4/2008
CN    101330388 A    12/2008

(Continued)

OTHER PUBLICATIONS

International Patent Application No. PCT/CN2020/096961; Int'l Written Opinion and Search Report; dated Aug. 28, 2020; 7 pages.

(Continued)

*Primary Examiner* — Daniel Rodriguez
(74) *Attorney, Agent, or Firm* — BakerHostetler

(57) ABSTRACT

A method and a device for processing an online collaborative document are provided. In the method, a voting type selection interface is generated in response to detecting that a voting trigger event occurs in the online collaborative document. A voting edition interface is generated in accordance with a target voting type selected through the voting type selection interface. A voting interface is generated in accordance with content inputted through the voting edition interface, where the voting interface includes a voting subject, a voting option and a voting button corresponding to the voting option. The voting interface is sent to at least one user terminal corresponding to the online collaborative document. A first expression icon is displayed at a first position corresponding to the voting option, in accordance with a selection instruction inputted through the user terminal.

14 Claims, 9 Drawing Sheets

(56) References Cited

U.S. PATENT DOCUMENTS

| | | | |
|---|---|---|---|
| 7,757,950 | B2 | 7/2010 | Seliger et al. |
| 10,732,789 | B1* | 8/2020 | Marcinelli ............ G06N 20/00 |
| 10,871,877 | B1* | 12/2020 | Clediere ................ G06Q 50/01 |
| 11,079,907 | B1* | 8/2021 | Cole ...................... H04L 51/10 |
| 2004/0135817 | A1* | 7/2004 | Daughtery .......... G06F 3/04842 |
| | | | 715/823 |
| 2006/0026502 | A1* | 2/2006 | Dutta ................... G06F 40/166 |
| | | | 715/201 |
| 2009/0265640 | A1* | 10/2009 | Abernethy ............. G06Q 30/02 |
| | | | 715/751 |
| 2012/0117463 | A1* | 5/2012 | Inglis ..................... G06F 40/58 |
| | | | 715/255 |
| 2013/0262373 | A1 | 10/2013 | Rampson |
| 2014/0052722 | A1* | 2/2014 | Bertsimas ............. G16H 10/20 |
| | | | 707/733 |
| 2015/0193792 | A1* | 7/2015 | Patel ................ G06Q 30/0276 |
| | | | 705/7.32 |
| 2016/0048486 | A1* | 2/2016 | Lopategui ............ G06F 40/197 |
| | | | 715/229 |
| 2016/0188125 | A1* | 6/2016 | Kaplan ................ G06F 3/0481 |
| | | | 715/730 |
| 2018/0081500 | A1* | 3/2018 | Erant .................. G06F 16/9537 |
| 2019/0188252 | A1* | 6/2019 | Vityaz .................... H04L 67/75 |
| 2020/0064997 | A1* | 2/2020 | Lewbel ................ G06F 40/106 |

FOREIGN PATENT DOCUMENTS

| | | |
|---|---|---|
| CN | 101984431 A | 3/2011 |
| CN | 102262620 A | 11/2011 |
| CN | 104221011 A | 12/2014 |
| CN | 104899956 A | 9/2015 |
| CN | 106330668 A | 1/2017 |
| CN | 107315921 A | 11/2017 |
| CN | 107528767 A | 12/2017 |
| CN | 110263286 A | 9/2019 |
| EP | 2831763 A1 | 2/2015 |

OTHER PUBLICATIONS

Wang Xiaodong; "The Design and Implementation of Multi-identity Anonymous Social System Based on Android"; Hauzhong University of Science and Technology; Thesis; Mar. 2019; 64 pages (English Abstract on p. 5).

"Lark, the next generation of collaborative learning systems"; https://zhuanlan.zhihu.com/p/61372693; Fat Smart Education Teacher; Apr. 2019; 17 pages (contains English Translation).

"Methods, Skills and Interactive Activities in Play-by-play Teaching Live Virtual Training"; Jiangsu People's Publishing House; © 2018; p. 171 (contains English Translation).

European Patent Application No. 20832021.8; Extended Search Report; dated Jun. 9, 2022; 7 pages.

* cited by examiner

ONLINE COLLABORATIVE DOCUMENT PROCESSING METHOD AND DEVICE

REFERENCE TO RELATED APPLICATION

This application is a continuation application of International Patent Application No. PCT/CN2020/096961, titled "ONLINE COLLABORATIVE DOCUMENT PROCESSING METHOD AND DEVICE", filed on Jun. 19, 2020, claims priority to Chinese Patent Application No. 201910549988.X, titled "ONLINE COLLABORATIVE DOCUMENT PROCESSING METHOD AND DEVICE", filed on Jun. 24, 2019 with the China National Intellectual Property Administration, both of which are incorporated herein by reference in their entireties.

FIELD

The present disclosure relates to the field of computer technology, and in particular to a method and a device for processing an online collaborative document.

BACKGROUND

A large number of electronic documents are produced in work of enterprise employees, such as various files and data, which are important information resources of enterprises. Enterprises usually have dedicated servers for storing various types of documents. Online collaboration documents become more and more popular in enterprises. Different from the traditional method of editing a local document by a local user, online collaboration documents in the server are often edited by multiple users. For example, multiple users edit a same work summary in the online manner, or multiple users register personal information in a same registration form. When editing a document in the online manner, different users may have different opinions on an item or detail in the document, so that the information needs to be determined through negotiation and voting.

However, the current online collaborative documents do not support the voting function. As a result, when users need to negotiate on some information in the edition of a document, they have to negotiate and vote repeatedly, which is cumbersome, resulting in a low efficiency of online collaborative document processing.

SUMMARY

A method and a device for processing an online collaborative document are provided in the present disclosure, to solve the problem of a low efficiency of online collaborative document processing due to the fact that the online collaborative documents in the conventional technology do not support the voting function, so that when users need to negotiate on some information in edition of a document, they have to negotiate and vote repeatedly, which is cumbersome.

In a first aspect of embodiments of the present disclosure, a method for processing an online collaborative document is provided, including:

generating a voting type selection interface in response to detecting that a voting trigger event occurs in the online collaborative document;

generating a voting edition interface in accordance with a target voting type selected through the voting type selection interface;

generating a voting interface in accordance with content inputted through the voting edition interface, where the voting interface includes a voting subject, a voting option and a voting button corresponding to the voting option;

sending the voting interface to at least one user terminal corresponding to the online collaborative document; and displaying a first expression icon at a first position corresponding to the voting option, in accordance with a selection instruction inputted through the user terminal.

In an optional implementation, the voting edition interface includes one first input box and multiple second input boxes; and the generating a voting interface in accordance with content inputted through the voting edition interface includes:

generating the voting subject on the voting interface in accordance with content inputted in the first input box;

generating voting options on the voting interface in accordance with content inputted in the multiple second input boxes; and generating voting buttons at second positions corresponding to the voting options.

In an optional implementation, the displaying a first expression icon at a first position corresponding to the voting option, in accordance with a selection instruction inputted through the user terminal includes:

receiving a selection instruction that a first user terminal selects the voting button on the voting interface; and rendering the voting button, and displaying the rendered voting button as the first expression icon at the first position.

In an optional implementation, after the rendering the voting button, the method further includes:

receiving a selection instruction that the first user terminal selects the rendered voting button, and generating an expression interface including at least one second expression icon; and updating the rendered voting button and replacing the first expression icon with the second expression icon, in response to a selection instruction that the first user terminal selects the second expression icon.

In an optional implementation, after the updating the rendered voting button and replacing the first expression icon with the second expression icon, in response to a selection instruction that the first user terminal selects the second expression icon, the method further includes:

receiving a selection instruction that a second user terminal selects a third expression icon on the expression interface, updating the rendered voting button and displaying the third expression icon at a position associated with the second expression icon.

In an optional implementation, the detecting that a voting trigger event occurs in the online collaborative document includes: detecting that a predetermined character is inputted in the online collaborative document or a voting initiation button is triggered.

In a second aspect of embodiments of the present disclosure, a device for processing an online collaborative document is provided, including:

a selection interface generating module, configured to generate a voting type selection interface in response to detecting that a voting trigger event occurs in the online collaborative document;

an edition interface generating module, configured to generate a voting edition interface in accordance with a target voting type selected through the voting type selection interface;

a voting interface generating module, configured to generate a voting interface in accordance with content inputted through the voting edition interface, where the voting interface includes a voting subject, a voting option and a voting button corresponding to the voting option;

a voting interface sending module, configured to send the voting interface to at least one user terminal corresponding to the online collaborative document; and a voting display module, configured to display a first expression icon at a first position corresponding to the voting option, in accordance with a selection instruction inputted through the user terminal.

In an optional implementation, the voting edition interface includes one first input box and multiple second input boxes; and the voting interface generating module is configured to: generate the voting subject on the voting interface in accordance with content inputted in the first input box; generate voting options on the voting interface in accordance with content inputted in the multiple second input boxes; and generate voting buttons at second positions corresponding to the voting options.

In an optional implementation, the voting display module is configured to receive a selection instruction that a first user terminal selects the voting button on the voting interface; and render the voting button, and display the rendered voting button as the first expression icon at the first position.

In an optional implementation, the device further includes a voting updating module, configured to receive a selection instruction that the first user terminal selects the rendered voting button, and generate an expression interface including at least one second expression icon; and update the rendered voting button and replace the first expression icon with the second expression icon, in response to a selection instruction that the first user terminal selects the second expression icon.

In an optional implementation, the voting updating module is further configured to: receive a selection instruction that a second user terminal selects a third expression icon on the expression interface, update the rendered voting button and display the third expression icon at a position associated with the second expression icon.

In an optional implementation, the detecting that a voting trigger event occurs in the online collaborative document includes: detecting that a predetermined character is inputted in the online collaborative document or a voting initiation button is triggered.

In a third aspect of embodiments of the present disclosure, an apparatus for processing an online collaborative document is provided, including at least one processor, and a memory storing computer instructions. The at least one processor is configured to execute the computer instructions stored in the memory to perform the method for processing an online collaborative document according to the above first aspect or any optional implementation in the first aspect.

In a fourth aspect of embodiments of the present disclosure, a computer-readable storage medium is provided, which stores computer instructions. The computer instructions, when being executed by a processor, cause the processor to perform the method for processing an online collaborative document according to the above first aspect or any optional implementation in the first aspect.

In the method and device for processing an online collaborative document provided in the present disclosure, a voting type selection interface is generated in response to detecting that a voting trigger event occurs in the online collaborative document. A voting edition interface is generated in accordance with a target voting type selected through the voting type selection interface. A voting interface is generated in accordance with content inputted through the voting edition interface, where the voting interface includes a voting subject, a voting option and a voting button corresponding to the voting option. The voting interface is sent to at least one user terminal corresponding to the online collaborative document. A first expression icon is displayed at a first position corresponding to the voting option, in accordance with a selection instruction inputted through the user terminal. In this way, the users can vote in the edition of the online collaborative document, which is simple in operation and thus can improve the efficiency of processing the online collaborative document. Furthermore, by displaying the expression icon at the position corresponding to the voting option selected by the user, the voting result can be intuitively presented.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below merely show a part of embodiments of the present disclosure, and those skilled in the art may obtain other drawings according to the provided drawings without any creative effort.

DETAILED DESCRIPTION

In order to make the objectives, technical solutions and advantages of embodiments of the present disclosure clearer, technical solutions of embodiments of the present disclosure are described clearly and completely below in conjunction with the drawings of the embodiments of the present disclosure. Apparently, the embodiments described in the following are only some of rather than all the embodiments of the present disclosure. Any other embodiments obtained by those skilled in the art based on the embodiments in the present disclosure without any creative effort shall fall within the protection scope of the present disclosure.

An online collaborative document is a document that can be collaboratively edited by multiple users in a real-time and synchronous manner.

Figure 1:
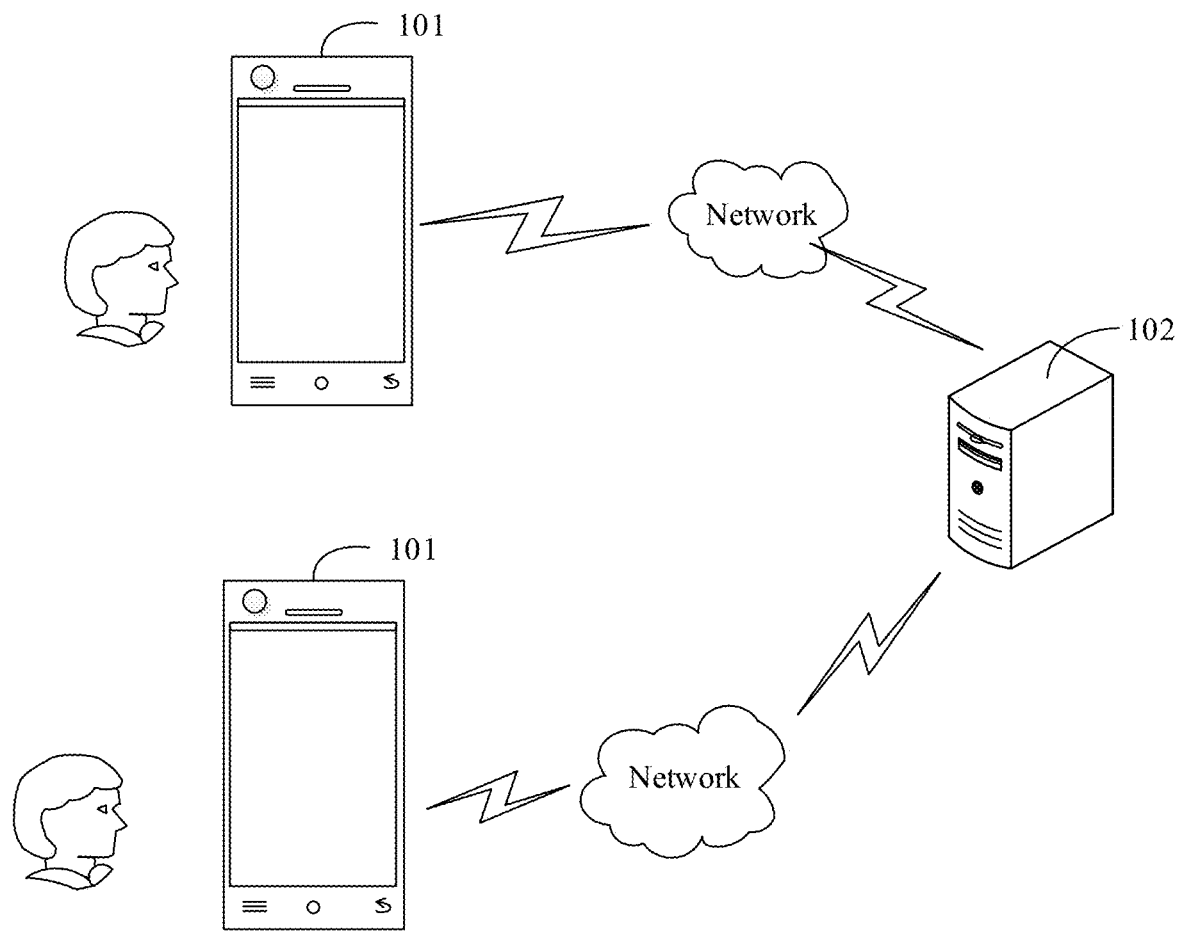
FIG. 1 is a schematic diagram showing a strucature of a system for processing an online collaborative document according to an embodiment of the present disclosure.

FIG. 1 is a schematic diagram showing a structure of a system for processing an online collaborative document according to an embodiment of the present disclosure. As shown in FIG. 1, the system provided in an embodiment of the present disclosure includes multiple user terminals 101 and a server 102. The user terminals 101 may be personal computers, mobile phones, tablets, and the like. The implementations of the user terminals 101 are not limited in the present disclosure, as long as the user terminals 101 can be used by users to edit an online collaborative document. The server 102 may be one server, a cluster composed of multiple servers, or a cloud computing platform.

Figure 2:
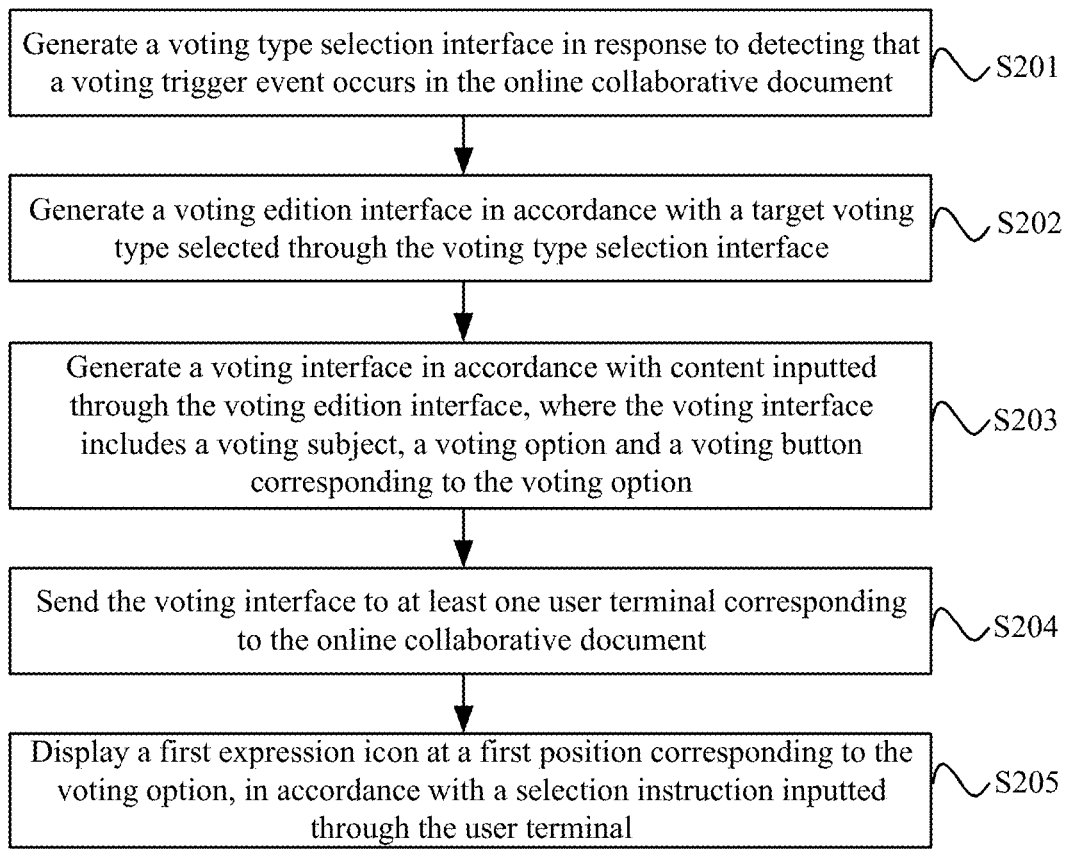
FIG. 2 is a first flowchart of a method for processing an online collaborative document according to an embodiment of the present disclosure.

FIG. 2 is a first flowchart of a method for processing an online collaborative document according to an embodiment of the present disclosure. This embodiment may be performed by any one of the user terminals or the server as shown in FIG. 1, which is not limited herein. As shown in FIG. 2, the method includes the following steps S201 to S205.

In step S201, a voting type selection interface is generated in response to detecting that a voting trigger event occurs in the online collaborative document.

In some embodiments, the online collaborative document may include plans to be reviewed in a meeting, or a plan designing interface to be reviewed in a meeting, or an entry guide or the like. The voting interface may be used to select a plan reviewed in the meeting, or feedback the experiences of using the plan design interface reviewed in the meeting, or feedback whether the entry guide is useful, or the like.

In some embodiments, the detecting that a voting trigger event occurs in the online collaborative document may include detecting that a predetermined character is inputted in the online collaborative document or a voting initiation button is triggered.

A voting initiation button may be provided in the online collaborative document. When the voting initiation button is triggered, a voting trigger event is detected and the voting type selection interface is generated. Alternatively, when a predetermined character is inputted in the online collaborative document, a voting trigger event is detected and the voting type selection interface is generated.

Figure 3:
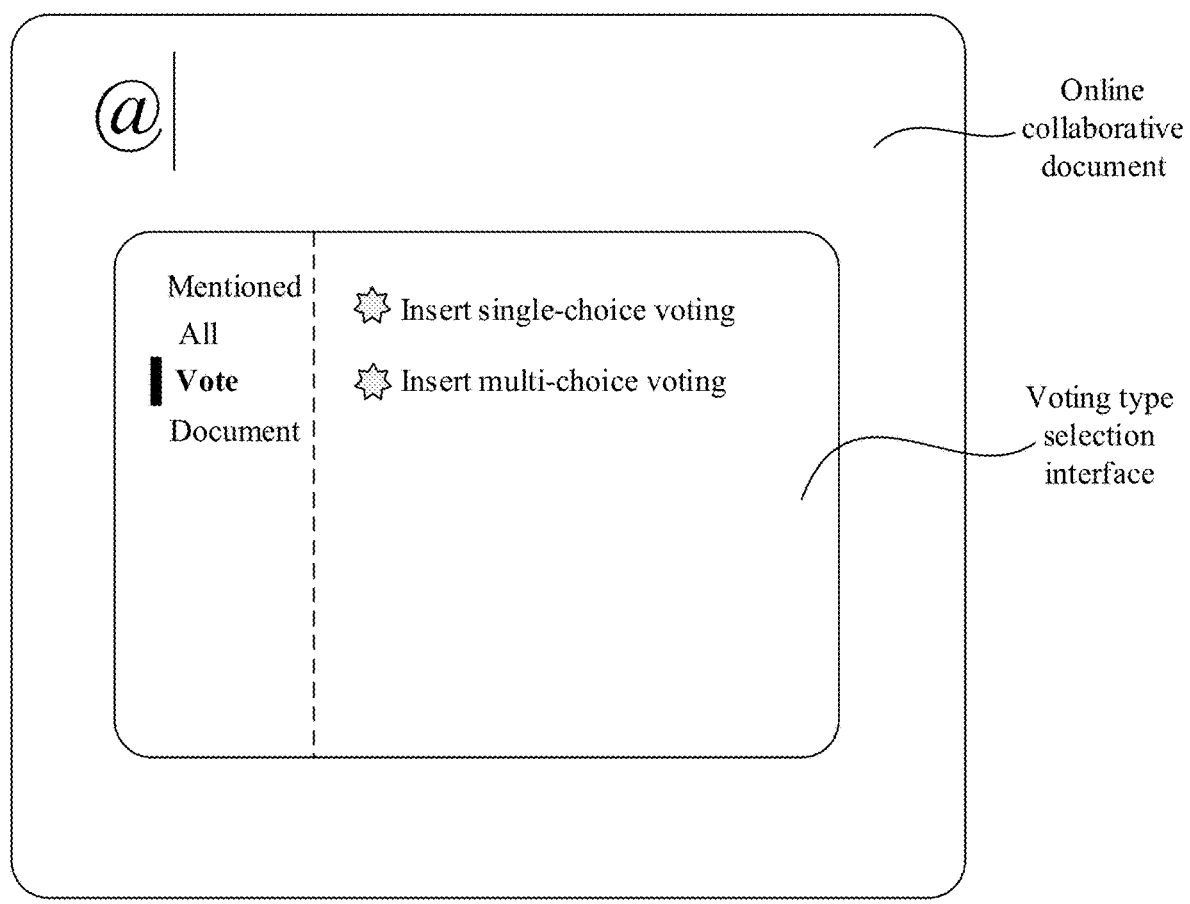
FIG. 3 is a first schematic diagram of generating a voting type selection interface according to an embodiment of the present disclosure.
Figure 4:
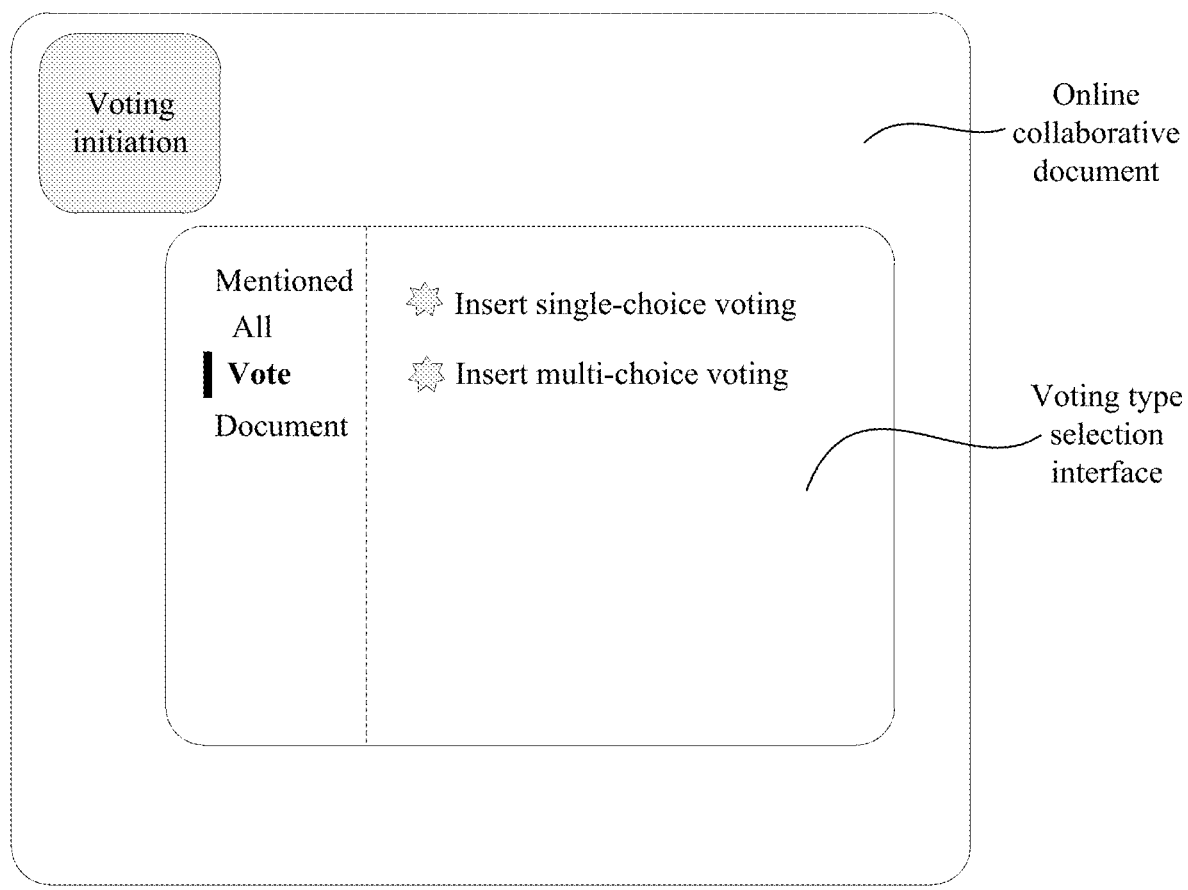
FIG. 4 is a second schematic diagram of generating a voting type selection interface according to an embodiment of the present disclosure.

FIG. 3 is a first schematic diagram of generating a voting type selection interface according to an embodiment of the present disclosure. The preset characters may be set as needed, such as the character "@". By entering "@" in the online collaboration document, the generation of a voting type selection interface is triggered. FIG. 4 is a second schematic diagram of generating a voting type selection interface according to an embodiment of the present disclosure. The generation of a voting type selection interface may be triggered by clicking or touching the "Voting initiation" button in the online collaboration document.

In step S202, a voting edition interface is generated in accordance with a target voting type selected through the voting type selection interface.

In some embodiments, the voting type selection interface may present a single-choice voting type and a multi-choice voting type. If the target voting type is the single-choice voting type, an edition interface for single-choice voting is generated. If the target voting type is the multi-choice voting type, an edition interface for multi-choice voting is generated.

Referring to FIGS. 3 and 4, on the voting type selection interface, the user may select the single-choice type by clicking or touching the "Insert single-choice voting" button, and thus the edition interface for single-choice voting is generated. The user may select the multi-choice type by clicking or touching the "Insert multi-choice voting" button, and thus the edition interface for multi-choice voting is generated.

The generated voting interface may be a voting card, on which different types of voting may be generated, such as multi-choice voting and single-choice voting. The voting card may include content of a voting subject, a voting option and a voting button corresponding to the voting option.

In step S203, a voting interface is generated in accordance with content inputted through the voting edition interface, where the voting interface includes a voting subject, a voting option and a voting button corresponding to the voting option.

In some embodiments, the voting edition interface includes one first input box and multiple second input boxes, the voting subject on the voting interface may be generated in accordance with content inputted via the first input box, voting options on the voting interface may be generated in accordance with content inputted via the multiple second input boxes, and voting buttons may be generated at second positions corresponding to the voting options.

Figure 5:
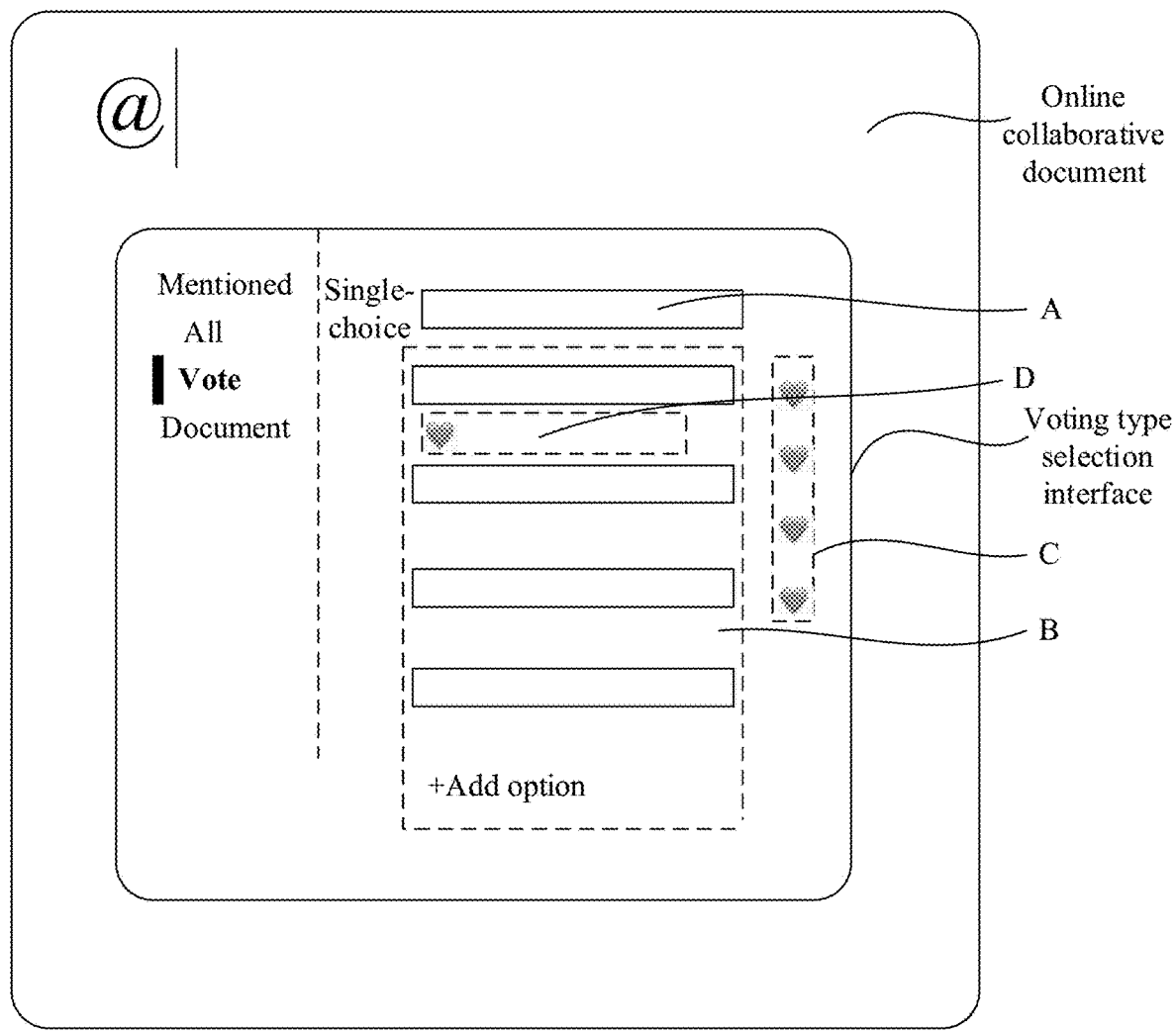
FIG. 5 is a schematic diagram of an edition interface according to an embodiment of the present disclosure.

FIG. 5 is a schematic diagram of an edition interface according to an embodiment of the present disclosure. The first input box is in the area A, used to input the voting subject by the user. The second input boxes are in the area B, used to input voting options by the user. Voting buttons generated at the second positions corresponding to the voting options are in the area C. The user may select a voting option by clicking or touching the voting button at the position corresponding to the voting option.

In some embodiments, the number of the voting options may be determined as needed. Referring to FIG. 5, an "Add option" button is provided in the area B, and the user can add a voting option by clicking or touch the "Add option" button.

In step S204, the voting interface is sent to at least one user terminal corresponding to the online collaborative document.

In some embodiments, the at least one user terminal may be user terminals corresponding to users who co-edit the online collaborative document. The user terminals may be the user terminals as shown in FIG. 1. The user may select a voting option on the voting interface via the user terminal, by clicking or touching a corresponding target voting button.

In step S205, a first expression icon is displayed at a first position corresponding to the voting option, in accordance with a selection instruction inputted through the user terminal.

In some embodiments, the selection instruction inputted through the user terminal is generated when the user operates the voting button corresponding to a voting option. The first expression icon may be displayed at the first position corresponding to the target voting option selected by the user on the user voting interface. In some embodiments, referring to FIG. 5, the first position may be in the area (the area D) below the target voting option selected by the user.

From above, a voting type selection interface is generated in response to detecting that a voting trigger event occurs in the online collaborative document. A voting edition interface is generated in accordance with a target voting type selected through the voting type selection interface. A voting interface is generated in accordance with content inputted through the voting edition interface, where the voting interface includes a voting subject, a voting option and a voting button corresponding to the voting option. The voting interface is sent to at least one user terminal corresponding to the online collaborative document. A first expression icon is displayed at a first position corresponding to the voting option, in accordance with a selection instruction inputted through the user terminal. In this way, the users can vote in the edition of the online collaborative document, which is simple in operation and thus can improve the efficiency of processing the online collaborative document. Furthermore, by displaying the expression icon at the position corresponding to the voting option selected by the user, the voting result can be intuitively presented.

Figure 6:
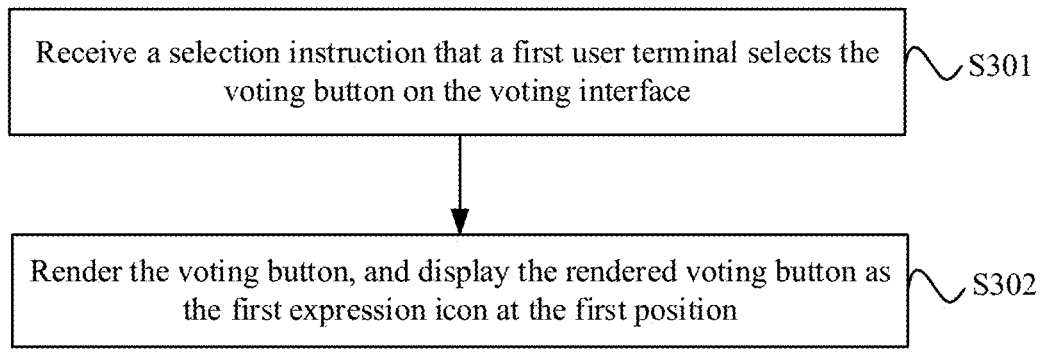
FIG. 6 is a second flowchart of a method for processing an online collaborative document according to an embodiment of the present disclosure.

FIG. 6 is a second flowchart of a method for processing an online collaborative document according to an embodiment of the present disclosure. In some embodiments, the step S205 of displaying a first expression icon at a first position corresponding to the voting option, in accordance with a selection instruction inputted through the user terminal includes the following steps S301 to S302.

In step S301, a selection instruction that a first user terminal selects the voting button on the voting interface is received.

In some embodiments, the first user terminal is any one of the at least one user terminal, which is not limited in the present disclosure.

In some embodiments, if the voting interface is in the single-choice voting type, the first user terminal generates a selection instruction of single-choice in response to that the user clicks or touches a voting button corresponding to one target voting option on the voting interface. If the voting interface is in the multi-choice voting type, the first user terminal generates a selection instruction of multi-choice in response to that the user clicks or touches at least one voting button corresponding to at least one target voting option on the voting interface.

In step 302, the voting button is rendered, and the rendered voting button is displayed at the first position as the first expression icon.

Figure 7:
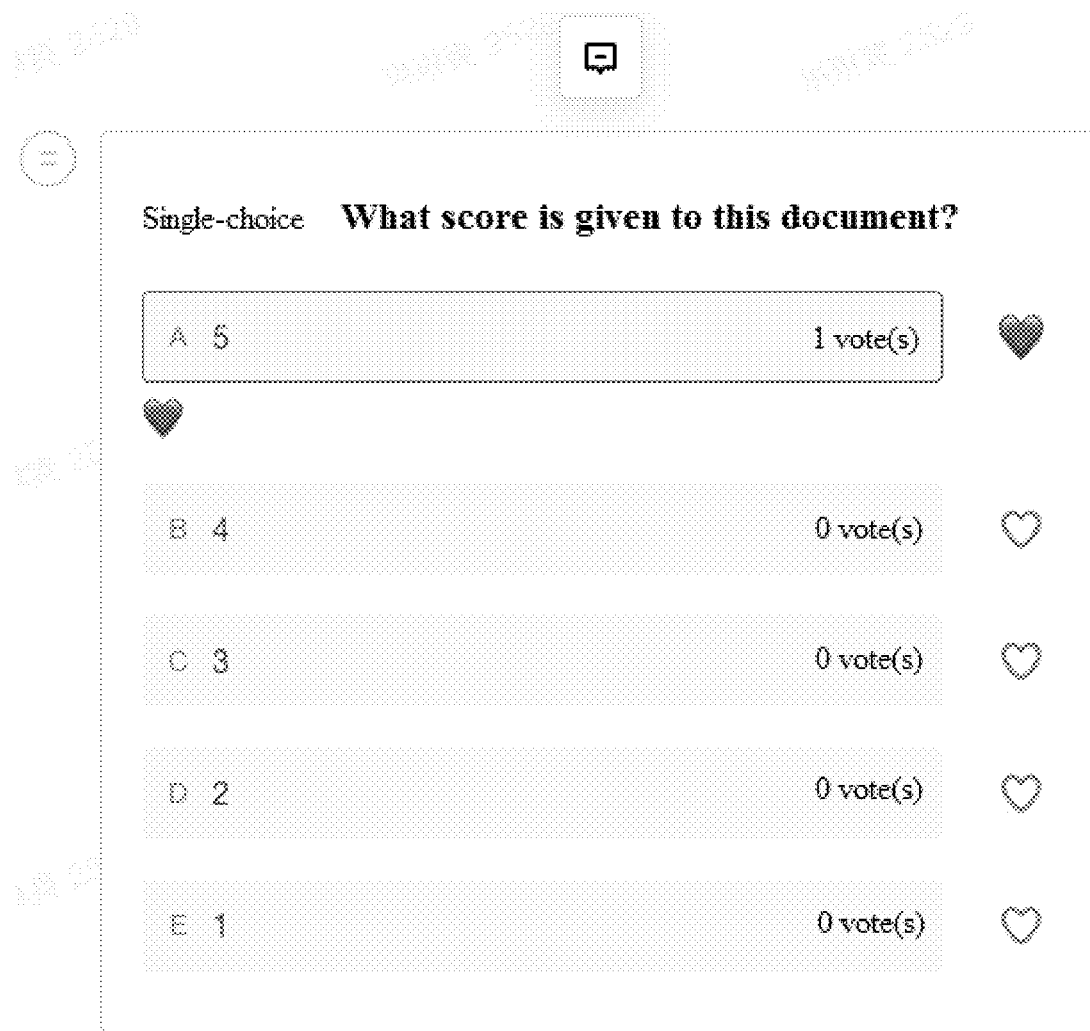
FIG. 7 is a first schematic diagram of a voting interface according to an embodiment of the present disclosure.

In some embodiments, the rendering of the voting button may be changing the uncolored voting button to be colored voting button. For example, referring to FIG. 7, the voting button may be originally a "blank heart-shaped" button, and may be changed to be a "red heart-shaped" button by rendering.

For example, the "red heart-shaped" button obtained by the rendering may be used as the first expression icon and displayed at the first position.

From the above, by rendering the voting button and displaying the rendered voting button as the first expression icon at the first position, the display of the voting interface is diverting, improving the interaction with users.

Figure 8:
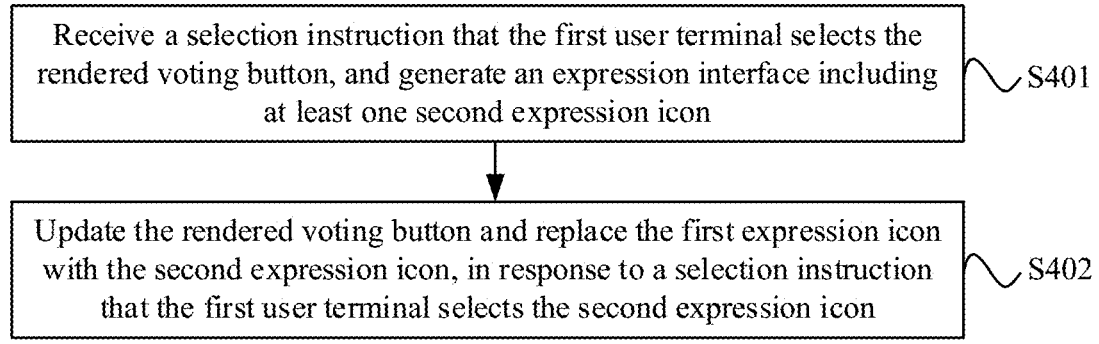
FIG. 8 is a third flowchart of a method for processing an online collaborative document according to an embodiment of the present disclosure.

FIG. 8 is a third flowchart of a method for processing an online collaborative document according to an embodiment of the present disclosure. After step S302, the method may further includes a process of updating the rendered voting button and replacing the first expression icon according to personality, as the following steps S401 and S402.

In step S401, a selection instruction that the first user terminal selects the rendered voting button is received, and an expression interface including at least one second expression icon is generated.

In some embodiments, the selection instruction that the first user terminal selects the rendered voting button may include hovering the cursor of the mouse over the rendered voting button, or touching the rendered voting button for a long time.

In step S402, the rendered voting button is updated and the first expression icon is replaced with the second expression icon, in response to a selection instruction that the first user terminal selects the second expression icon.

In some embodiments, in response to the selection instruction that the first user terminal selects the second expression icon, an expression icon library may be opened and a new expression icon is selected from the expression icon library to be used as the new rendered voting button, and used as the second expression icon to replace the first expression icon.

The expression library may be an emoji expression icon library or other customized expression icon library. The second expression icon is obtained by clicking or touching any icon in the expression icon library.

Figure 9:
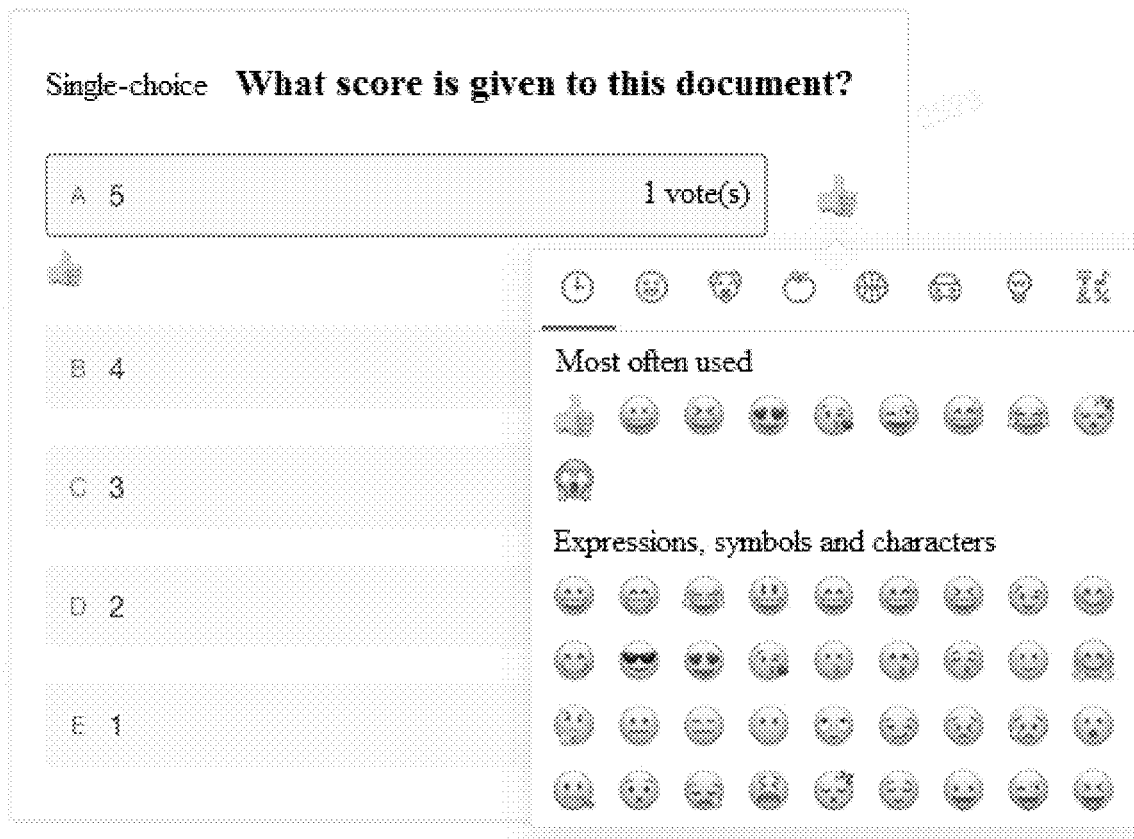
FIG. 9 is a second schematic diagram of a voting interface according to an embodiment of the present disclosure.

FIG. 9 shows an example of the expression icon library according to an embodiment of the present disclosure. By hovering the cursor of the mouse over the voting button, the expression icon library as shown in FIG. 9 is opened. By clicking any icon in the expression icon library, the newly selected expression icon is used as the newly rendered voting button, and the first expression icon below the target voting option is replaced with the newly selected expression icon (the hand icon), i.e., the second expression icon.

From the above, by changing the expression icon for the voting button, users can present the expressions according to their personality, meeting the requirements of different users.

In some embodiments, after the above step S402, the method further includes step S403.

In step S403, a selection instruction that a second user terminal selects a third expression icon on the expression interface is received, the rendered voting button is updated and the third expression icon is displayed at a position associated with the second expression icon.

In some embodiments, the position associated with the second expression icon may be an adjacent position below or behind the first position where the second expression icon is located.

From above, by displaying the third expression icon selected by the second user terminal at the position associated with the second expression icon, the voting expression of other users can be presented, enhancing the interaction of the voting.

In some embodiments, when receiving from other user terminals the voting options selected through the voting button and the first or second expression icons corresponding to the selected voting options, the voting result is updated on the voting interface in a real-time manner according to the voting options and the corresponding first or second expression icons.

Figure 10:
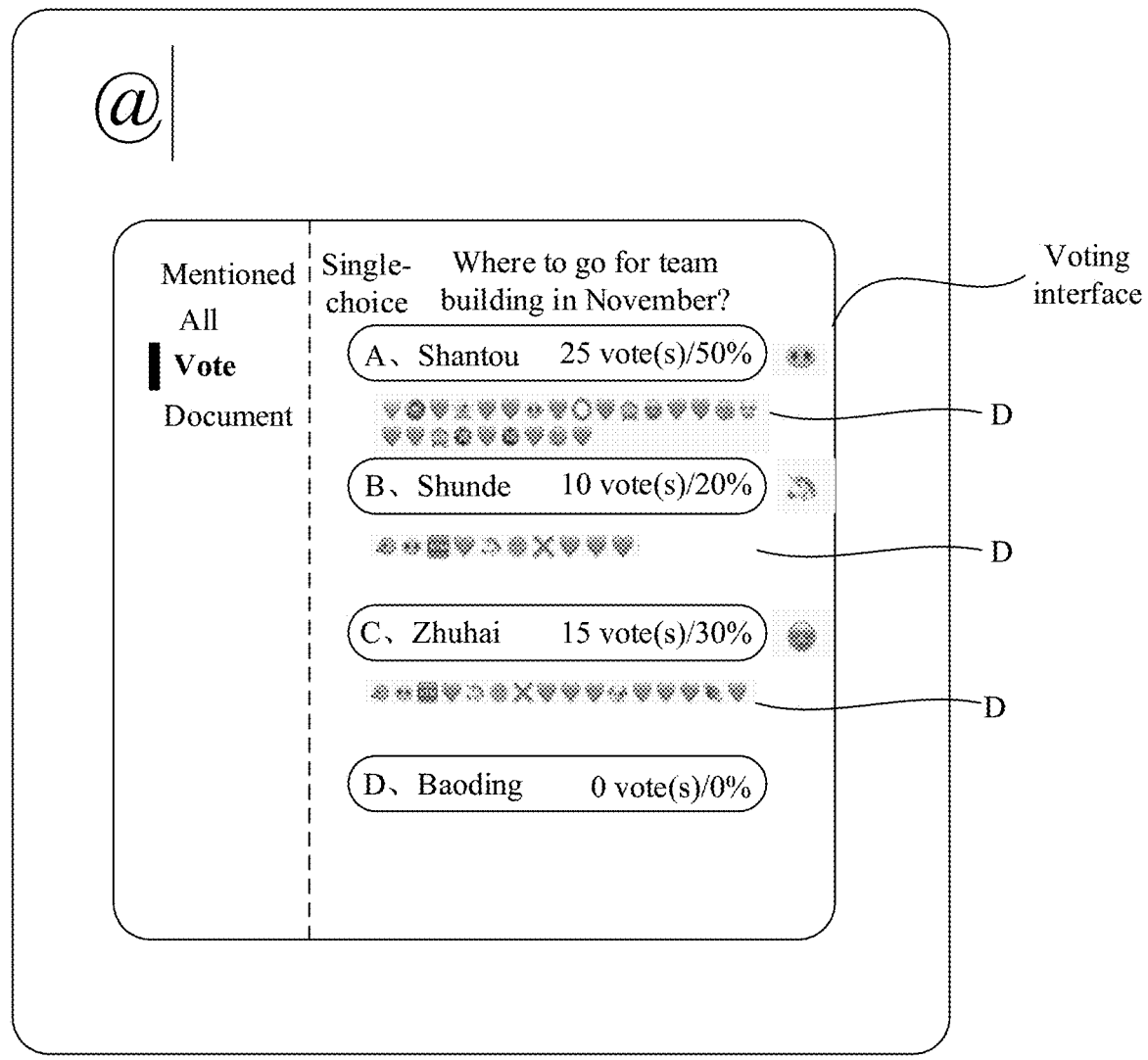
FIG. 10 is a schematic diagram of an updated voting interface according to an embodiment of the present disclosure.

FIG. 10 is a schematic diagram of an updated voting interface according to an embodiment of the present disclosure. The voting result may include the number or the percentage of votes for each voting option, and the expression icons selected by the users are presented under each voting option. The updated voting interface is sent to multiple user terminal corresponding to the online collaborative document, so that each user review the updated voting interface via the user terminal, which shows the final voting result and the expression icons selected by individual users.

Figure 11:
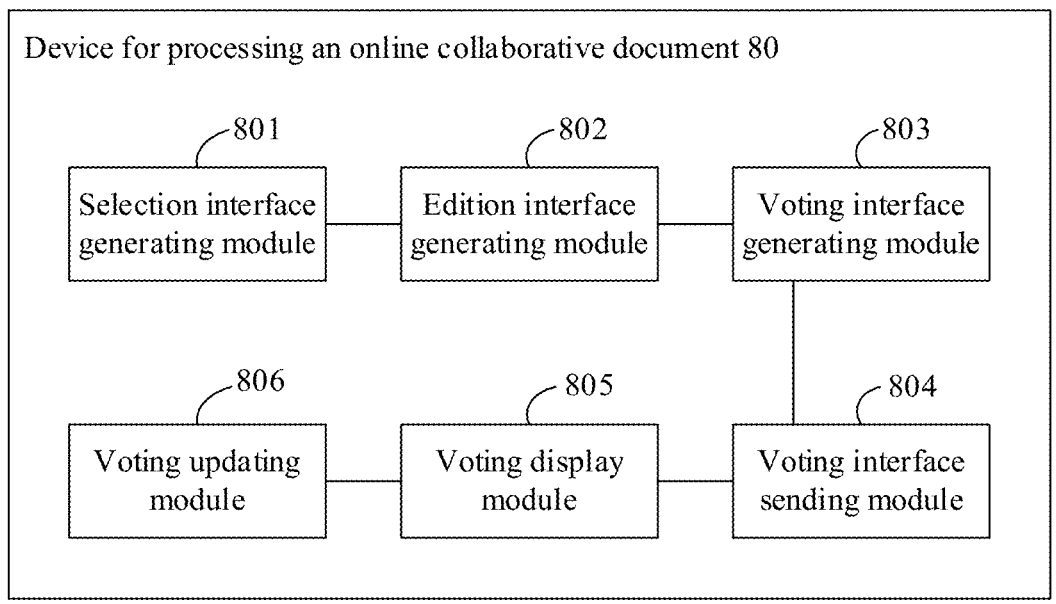
FIG. 11 is a schematic strucatural diagram of a device for processing an online collaborative document according to an embodiment of the present disclosure.

FIG. 11 is a schematic strucatural diagram of a device for processing an online collaborative document according to an embodiment of the present disclosure. As shown in FIG. 11, the device 80 for processing an online collaborative document includes the following modules 801 to 805.

A selection interface generating module 801 is configured to generate a voting type selection interface in response to detecting that a voting trigger event occurs in the online collaborative document.

An edition interface generating module 802 is configured to generate a voting edition interface in accordance with a target voting type selected through the voting type selection interface.

A voting interface generating module 803 is configured to generate a voting interface in accordance with content inputted through the voting edition interface, where the voting interface includes a voting subject, a voting option and a voting button corresponding to the voting option.

A voting interface sending module 804 is configured to send the voting interface to at least one user terminal corresponding to the online collaborative document.

A voting display module 805 is configured to display a first expression icon at a first position corresponding to the voting option, in accordance with a selection instruction inputted through the user terminal.

The device according to the embodiment may be used to perform the technical solutions according to the above method embodiments. The principles and technical effects are similar, and are not repeated herein.

In some embodiments, the voting edition interface includes one first input box and multiple second input boxes. The voting interface generating module 803 is configured to generate the voting subject on the voting interface in accordance with content inputted in the first input box, generate voting options on the voting interface in accordance with content inputted in the multiple second input boxes, and generate voting buttons at second positions corresponding to the voting options.

In some embodiments, the voting display module 805 is configured to receive a selection instruction that a first user terminal selects the voting button on the voting interface, render the voting button, and display the rendered voting button as the first expression icon at the first position.

Referring to FIG. 11, in some embodiments, the device further includes a voting updating module 806, configured to receive a selection instruction that the first user terminal selects the rendered voting button, and generate an expression interface including at least one second expression icon; and update the rendered voting button and replace the first expression icon with the second expression icon, in response to a selection instruction that the first user terminal selects the second expression icon.

In some embodiments, the voting updating module is further configured to receive a selection instruction that a second user terminal selects a third expression icon on the expression interface, update the rendered voting button and display the third expression icon at a position associated with the second expression icon.

In some embodiments, the detecting that a voting trigger event occurs in the online collaborative document includes detecting that a predetermined character is inputted in the online collaborative document or a voting initiation button is triggered.

The devices according to the embodiments may be used to perform the technical solutions according to the above method embodiments. The principles and technical effects are similar, and are not repeated herein.

Figure 12:
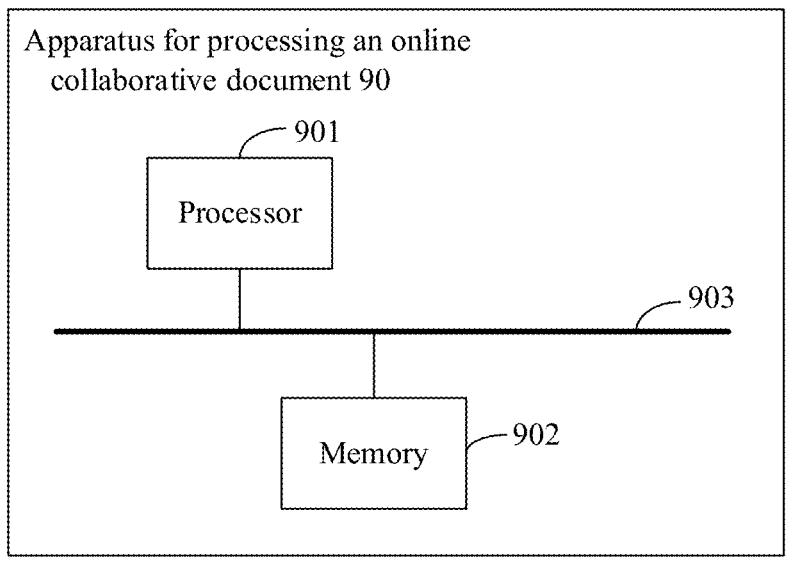
FIG. 12 is a schematic diagram showing a hardware strucature of an apparatus for processing an online collaborative document according to an embodiment of the present disclosure.

FIG. 12 is a schematic diagram showing a hardware strucature of an apparatus for processing an online collaborative document according to an embodiment of the present disclosure. Referring to FIG. 12, the apparatus 90 for processing an online collaborative document according to the embodiment includes a processor 901 and a memory 902.

The memory 902 stores computer instructions.

The processor 902 is configured to execute the computer instructions stored in the memory to perform the steps performed by the user device or the server in the above embodiments. One may refer to the above method embodiments for details.

Optionally, the memory 902 may be independent from the processor 901 or may be integrated with the processor 901.

If the memory 902 is independent, the apparatus for processing an online collaborative document further includes a bus 903 for connecting the memory 902 to the processor 901.

A computer-readable storage medium is provided according to an embodiment, which stores computer instructions. The computer instructions, when being executed by a processor, cause the processor to perform the above methods for processing an online collaborative document.

In the embodiments provided in the present disclosure, it should be understood that the disclosed devices and methods may be implemented in other ways. For example, the device embodiments described above are only illustrative. For example, the division of the modules is only a logical function division, and there may be other divisions in actual implementation. For example, multiple modules can be combined or integrated to another system, or some features may be omitted, or not implemented. In addition, the displayed or discussed mutual coupling or direct coupling or communication connection may be indirect coupling or communication connection through some interfaces, devices or modules, and may be in electrical, mechanical or other forms.

The modules described as separate components may or may not be physically separated, and the components displayed as modules may or may not be physical units, that is, they may be located in one place, or they may be distributed on multiple network units. Some or all of the modules may be selected according to actual needs to achieve the objectives of the solutions of the embodiments of the present disclosure.

In addition, the functional modules in the various embodiments of the present disclosure may be integrated into one processing unit, or may be implemented as separated physical modules, or two or more modules may be integrated into one unit. The units formed by the above-mentioned modules may be implemented in the form of hardware, or in the form of hardware with software functional units.

The above-mentioned integrated modules implemented in the form of software functional module may be stored in a computer readable storage medium. The above-mentioned software function module is stored in a storage medium and includes instructions used to cause a computer device (which may be a personal computer, a server, or a network device, or the like) or a processor to execute some steps of the methods according to the embodiments of the present disclosure.

It should be understood that the foregoing processor may be a central processing unit (CPU), another general-purpose processor, a digital signal processor (DSP), an application specific integrated circuit (ASIC), or the like. The general-purpose processor may be a microprocessor or any conventional processor or the like. The steps of the methods in the disclosure may be directly performed by a hardware processor, or performed by a combination of hardware and software modules in the processor.

The memory may include a high-speed RAM memory, and may also include a non-volatile storage NVM, such as at least one magnetic memory, and may also be a U-disk, a mobile hard disk, a read-only memory, a magnetic disk, or an optical disk.

The bus may be an industry standard architecture (ISA) bus, a peripheral device interconnection (PCI) bus, or an Extended Industry Standard Architecture (EISA) bus, or the like. The bus may be classified as an address bus, a data bus, a control bus and so on. For ease of representation, the bus in the drawings is not limited to only one bus or one type of bus.

The above-mentioned storage medium may be embodied by any type of volatile or non-volatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic disk or an optical disk. The storage medium may be any available medium that can be accessed by a general-purpose or special-purpose computer.

An exemplary storage medium is coupled to the processor, so that the processor can read information from the storage medium and can write information to the storage medium. Apparently, the storage medium may be a part of the processor. The processor and the storage medium may be located in an Application Specific Integrated Circuit (ASIC). Apparently, the processor and the storage medium may be separated components in an electronic device or a main control device.

A person of ordinary skill in the art can understand that all or a part of the steps in the foregoing method embodiments may be implemented by a program instructing relevant hardware. The aforementioned program may be stored in a computer readable storage medium. When the program is executed, the steps of the foregoing method embodiments are performed. The foregoing storage medium includes: a ROM, a RAM, a magnetic disk, an optical disk, or other media capable of storing program codes.

Finally, it should be noted that the above embodiments are only used to illustrate the technical solutions of the present disclosure, rather than limiting. Although the present disclosure has been described in detail with reference to the foregoing embodiments, those of ordinary skill in the art should understand that the technical solutions in the foregoing embodiments may be modified, or some or all of the technical features may be replaced by equivalents. These modifications or replacements do not make the essence of the corresponding technical solutions deviate from the scope of the technical solutions of the embodiments of the present disclosure.

The invention claimed is:

1. A method for processing an online collaborative document, comprising:
    generating a voting type selection interface in response to detecting that a voting trigger event occurs in a displayed portion of the online collaborative document;
    generating a voting edition interface in accordance with a target voting type selected through the voting type selection interface;
    generating a voting interface in accordance with content inputted through the voting edition interface, wherein the voting interface comprises a voting subject, a voting option and a voting button corresponding to the voting option;
    sending the voting interface to at least one user terminal corresponding to the online collaborative document; and
    displaying a first expression icon at a first position corresponding to the voting option in the voting interface sent to the at least one user terminal, in accordance with a selection instruction inputted through the at least one user terminal.

2. The method according to claim 1, wherein the voting edition interface comprises one first input box and a plurality of second input boxes; and
    the generating a voting interface in accordance with content inputted through the voting edition interface comprises:
        generating the voting subject on the voting interface in accordance with content inputted in the first input box;
        generating voting options on the voting interface in accordance with content inputted in the plurality of second input boxes; and
        generating voting buttons at second positions corresponding to the voting options.

3. The method according to claim 1, wherein the displaying a first expression icon at a first position corresponding to the voting option, in accordance with a selection instruction inputted through the user terminal comprises:
    receiving a selection instruction that a first user terminal selects the voting button on the voting interface; and
    rendering the voting button, and displaying the rendered voting button as the first expression icon at the first position.

4. The method according to claim 3, wherein after the rendering the voting button, the method further comprises:
    receiving a selection instruction that the first user terminal selects the rendered voting button, and generating an expression interface comprising at least one second expression icon; and
    updating the rendered voting button and replacing the first expression icon with the second expression icon, in response to a selection instruction that the first user terminal selects the second expression icon.

5. The method according to claim 4, wherein after the updating the rendered voting button and replacing the first expression icon with the second expression icon, in response to a selection instruction that the first user terminal selects the second expression icon, the method further comprises:
    receiving a selection instruction that a second user terminal selects a third expression icon on the expression interface, updating the rendered voting button and displaying the third expression icon at a position associated with the second expression icon.

6. The method according to claim 1, wherein the detecting that a voting trigger event occurs in the online collaborative document comprises:
    detecting that a predetermined character is inputted in the online collaborative document or a voting initiation button is triggered.

7. A device for processing an online collaborative document, comprising:
at least one processor; and at least one memory communicatively coupled to the at least one processor and storing instructions that upon execution by the at least one processor cause the apparatus to perform operations comprising:
generating a voting type selection interface in response to detecting that a voting trigger event occurs in a displayed portion of the online collaborative document;
generating a voting edition interface in accordance with a target voting type selected through the voting type selection interface;
generating a voting interface in accordance with content inputted through the voting edition interface, wherein the voting interface comprises a voting subject, a voting option and a voting button corresponding to the voting option;
sending the voting interface to at least one user terminal corresponding to the online collaborative document; and
displaying a first expression icon at a first position corresponding to the voting option in the voting interface sent to the at least one user terminal, in accordance with a selection instruction inputted through the at least one user terminal.

8. The device according to claim 7, wherein the voting edition interface comprises one first input box and a plurality of second input boxes; and
the generating a voting interface in accordance with content inputted through the voting edition interface comprises:
generating the voting subject on the voting interface in accordance with content inputted in the first input box;
generating voting options on the voting interface in accordance with content inputted in the plurality of second input boxes; and
generating voting buttons at second positions corresponding to the voting options.

9. The device according to claim 7, wherein the displaying a first expression icon at a first position corresponding to the voting option, in accordance with a selection instruction inputted through the user terminal comprises:

receiving a selection instruction that a first user terminal selects the voting button on the voting interface; and
rendering the voting button, and displaying the rendered voting button as the first expression icon at the first position.

10. The device according to claim 9, wherein the at least one memory further stores instructions that upon execution by the at least one processor cause the device to:
receiving a selection instruction that the first user terminal selects the rendered voting button, and generating an expression interface comprising at least one second expression icon; and
updating the rendered voting button and replacing the first expression icon with the second expression icon, in response to a selection instruction that the first user terminal selects the second expression icon.

11. The device according to claim 10, wherein the at least one memory further stores instructions that upon execution by the at least one processor cause the device to:
receiving a selection instruction that a second user terminal selects a third expression icon on the expression interface, updating the rendered voting button and displaying the third expression icon at a position associated with the second expression icon.

12. The device according to claim 7, wherein the detecting that a voting trigger event occurs in the online collaborative document comprises:
detecting that a predetermined character is inputted in the online collaborative document or a voting initiation button is triggered.

13. An apparatus for processing an online collaborative document, comprising:
at least one processor, and
a memory storing computer instructions;
wherein the at least one processor is configured to execute the computer instructions stored in the memory to perform the method for processing an online collaborative document according to claim 1.

14. A non-transitory computer-readable storage medium, storing computer instructions, wherein the computer instructions, when being executed by a processor, cause the processor to perform the method for processing an online collaborative document according to claim 1.

* * * * *